No. 779,310. Patented January 3, 1905.

UNITED STATES PATENT OFFICE.

SAMUEL PEACOCK, OF CHICAGO, ILLINOIS.

PROCESS OF OBTAINING METALS FROM THEIR ORES.

SPECIFICATION forming part of Letters Patent No. 779,310, dated January 3, 1905.

Application filed February 17, 1904. Serial No. 194,084.

*To all whom it may concern:*

Be it known that I, SAMUEL PEACOCK, a citizen of the United States, residing at Chicago, in the county of Cook and State of Illinois, have invented certain new and useful Improvements in Processes of Obtaining Metals from Their Ores; and I do hereby declare the following to be a full, clear, and exact description of the invention, such as will enable others skilled in the art to which it appertains to make and use the same.

My invention relates to the process of obtaining iron and zinc, principally the latter, from ores containing the same. This process relates especially to ores containing sulfids of iron and zinc.

Great difficulties have been encountered in economically treating ores of this character that carry any large percentage of iron—from four per cent. upward, for example. It is practically impossible to completely desulfurize such ores by roasting, and then in the smelting operation the iron combines with the sulfur left in the ores and also with the sulfur in the reducing material, (and there is often an appreciable amount of sulfur in this reducing material,) forming a highly-corrosive slag, which soon destroys the retorts in which the distillation process for the recovery of zinc is carried out. Furthermore, the presence of iron oxids requires a larger consumption of the reducing material, usually carbon or coal, which in the recovery of the zinc produces no useful results. The object of my invention is to reduce the percentage of iron carried by such ores to such a low figure that it will not practically interfere with the zinc distillation.

In carrying out my process the ore containing the sulfids of iron and zinc is pulverized and then roasted. The roasted ore is then either heated in a furnace while mixed with carbon or subjected to the action of a reducing-gas in a furnace at such a temperature that while the iron oxids are reduced to metallic iron the zinc oxids remain unreduced. After all the iron has practically been reduced to a metallic condition the furnace is cooled down in a reducing atmosphere—that is to say, in an atmosphere containing no free oxygen—in order to prevent reoxidization of the finely-divided hot material, or the charge is withdrawn from the furnace into a cooling chamber or receptacle the atmosphere of which is maintained a reducing one. The metallic iron is then removed from the ore either by a magnetic separator or by gravity. The oxid of the zinc, which is then practically pure, so far as the presence of iron is concerned, is then put into retorts and distilled in the usual way. Furthermore, the metallic iron thus obtained is available for commercial use, and up to this time, so far as I am aware, this has never been done.

Having thus described my invention, what I claim as new, and desire to secure by Letters Patent, is—

1. The process of treating ores containing iron and zinc, which consists in roasting the same, reducing the iron to a metallic state at a temperature too low to reduce the zinc to a metallic state, separating the iron from the mass and then reducing the zinc to a metallic state, substantially as described.

2. The process of obtaining iron and zinc from the ores containing such metals as sulfids, which consists in pulverizing such ores, roasting them, subjecting the roasted mass to the action of a heated reducing agent at a temperature high enough to reduce the iron but too low to reduce the zinc, cooling the heated mass in a reducing atmosphere, separating out the metallic iron and finally reducing the zinc in the usual manner, substantially as described.

In testimony whereof I affix my signature in presence of two witnesses.

SAMUEL PEACOCK.

Witnesses:
N. FINLEY,
M. BOTHWELL.